(12) United States Patent
Hastings

(10) Patent No.: US 6,802,686 B1
(45) Date of Patent: Oct. 12, 2004

(54) TIP-UP TRAILER AND METHOD FOR LOADING THE SAME

(76) Inventor: Tom Hastings, 9902 S. 148$^{th}$ St., Omaha, NE (US) 68138

( * ) Notice: Subject to any disclaimer, the term of this patent is extended or adjusted under 35 U.S.C. 154(b) by 157 days.

(21) Appl. No.: 10/113,033

(22) Filed: Apr. 1, 2002

(51) Int. Cl.$^7$ .............................................. B60R 19/24
(52) U.S. Cl. ....................................... 414/471; 293/118
(58) Field of Search .......................... 414/471; 293/118, 293/125, 102

(56) References Cited

U.S. PATENT DOCUMENTS

| | | | | |
|---|---|---|---|---|
| 3,638,817 A | * | 2/1972 | Corompt | 414/477 |
| 3,892,323 A | * | 7/1975 | Corompt | 414/491 |
| 4,147,266 A | * | 4/1979 | Corompt | 414/480 |
| 4,410,207 A | * | 10/1983 | Scharf | 293/118 |
| 5,624,143 A | * | 4/1997 | Waldschmitt | 293/118 |
| 5,662,453 A | * | 9/1997 | Gerstner et al. | 414/812 |
| 6,109,675 A | * | 8/2000 | Sumrall | 293/118 |
| 2002/0150454 A1 | * | 10/2002 | Chabanas et al. | 414/498 |

FOREIGN PATENT DOCUMENTS

GB 2037932 * 7/1980

* cited by examiner

Primary Examiner—James W. Keenan

(57) ABSTRACT

A tip-up trailer includes an ICC bumper that has been structurally enhanced to support the entire load of a loaded shipping container jointly with the rearward-most axle of the trailer. The bumper includes a rotatable bearing on a lower member, which permits the lower member to travel along the ground as the tipped-up trailer is lowered after loading. The method of the invention includes the initial step of connecting a container to a tip-up trailer with the doors of the container oriented towards the forward end of the trailer. The doors are opened and the forward end of the trailer is raised. The container is then loaded with bulk material. Once the container doors are closed, the forward end of the trailer is lowered while bearings on the bumper roll on the ground.

4 Claims, 4 Drawing Sheets

US 6,802,686 B1

TIP-UP TRAILER AND METHOD FOR LOADING THE SAME

CROSS-REFERENCES TO RELATED APPLICATIONS (Not applicable)

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to tractor-trailers, and more particularly to an improved trailer designed for tipping up for loading and to a method of loading such a trailer.

(2) Background Information

Shipping containers are currently being used on tractor-trailers for hauling bulk materials such as seed, grain, and the like. Typically, the bulk material is loaded into a shipping container and the container is then mounted on a trailer for transport to a desired location.

In order to unload the container, a fifth wheel hydraulically liftable jack is provided. The fifth wheel is connected to the king pin of the trailer, and utilizes a hydraulic liftable jack to raise the forward end of the trailer. The doors of the container are opened to permit the material to be dumped out the rearward end of the container. As the jack raises the forward end of the trailer, the material in the bladder is gradually discharged.

While the dumping of bulk material from a shipping container has been very effective, there has been no convenient method for directly loading the container. Rather, it has been necessary to fill the container by auguring or conveying the material into the container. This method takes excessive time and leaves a significant void towards the roof portion of the container. Further, there has been no trailer specifically designed to permit direct loading of a shipping container that is mounted on the trailer.

BRIEF SUMMARY OF THE INVENTION

It is therefore a general object of the present invention to provide an improved trailer for loading shipping containers mounted on said trailer.

Another object of the present invention is to provide an improved method for loading a shipping container that has been mounted on said trailer.

A further object is to provide a tip-up trailer with an improved structure designed for supporting a shipping container during the loading of the container.

These and other objects of the present invention will be apparent to those skilled in the art.

The improved tip-up trailer of the present invention includes an ICC bumper that has been structurally enhanced to support up to the entire load of a loaded shipping container jointly with the rearward-most axle of the trailer. In addition, the bumper includes a rotatable bearing on a lower member, which permits the lower member to travel along the ground as the tipped-up trailer is lowered after loading.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
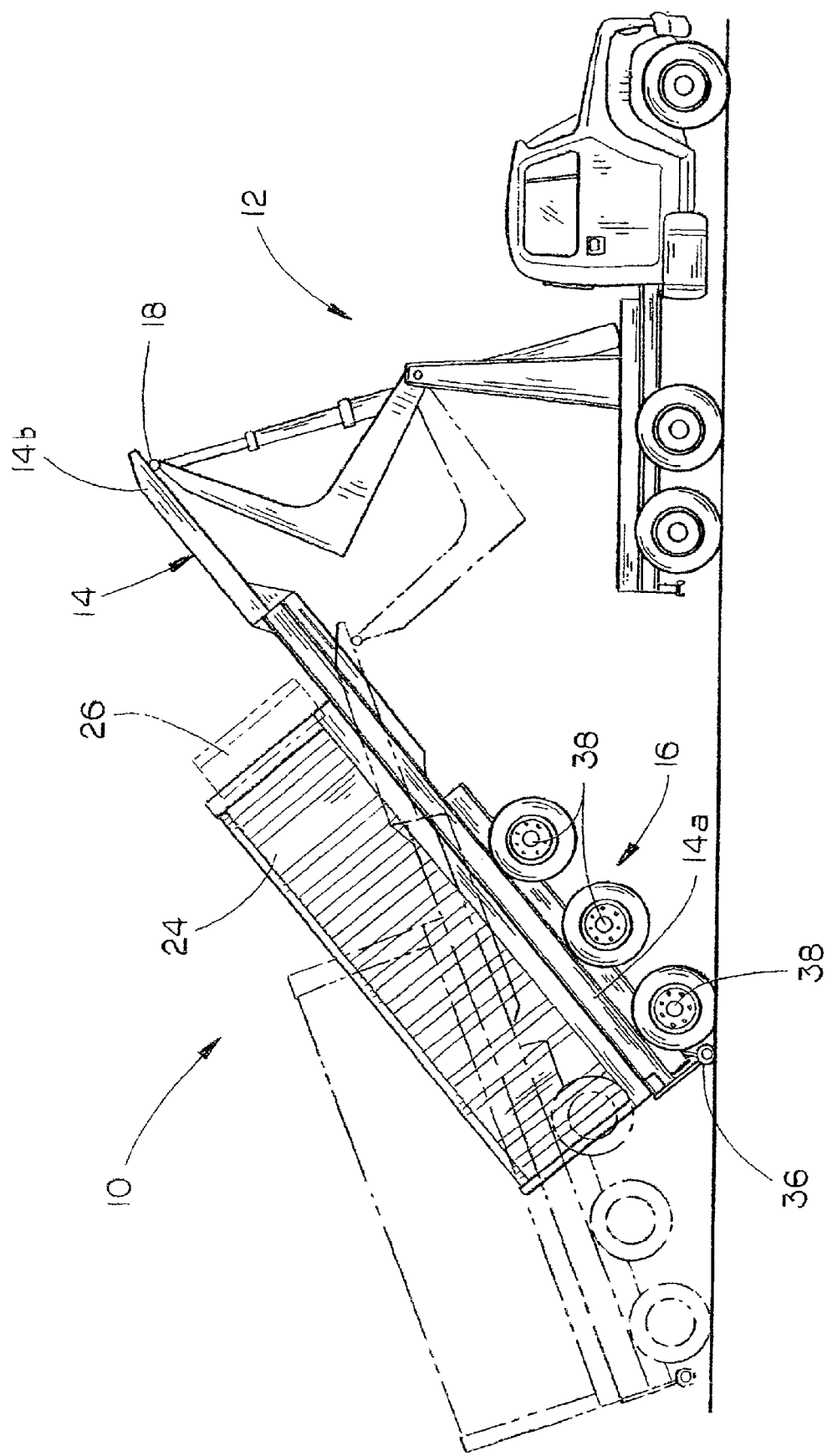
FIG. 1 is an elevational view showing the improved trailer of the invention and the method of loading of the present invention.

Referring now to the drawings, in which similar or corresponding parts are identified with the same reference numeral, and more particularly to FIG. 1, the improved tip-up trailer of the present invention is designated generally at 10, and is shown tipped up to a loading position by a fifth wheel jack 12.

Trailer 10 includes a frame, designated generally at 14, with a wheelset 16 mounted at the rearward end 14a thereof. Forward end 14b of frame 14 includes a kingpin 18, for selective connection to a fifth wheel, in a conventional fashion. As shown, in FIG. 1, kingpin 18 is also used in the tipping of the trailer 10 during the method of the present invention.

Figure 2:
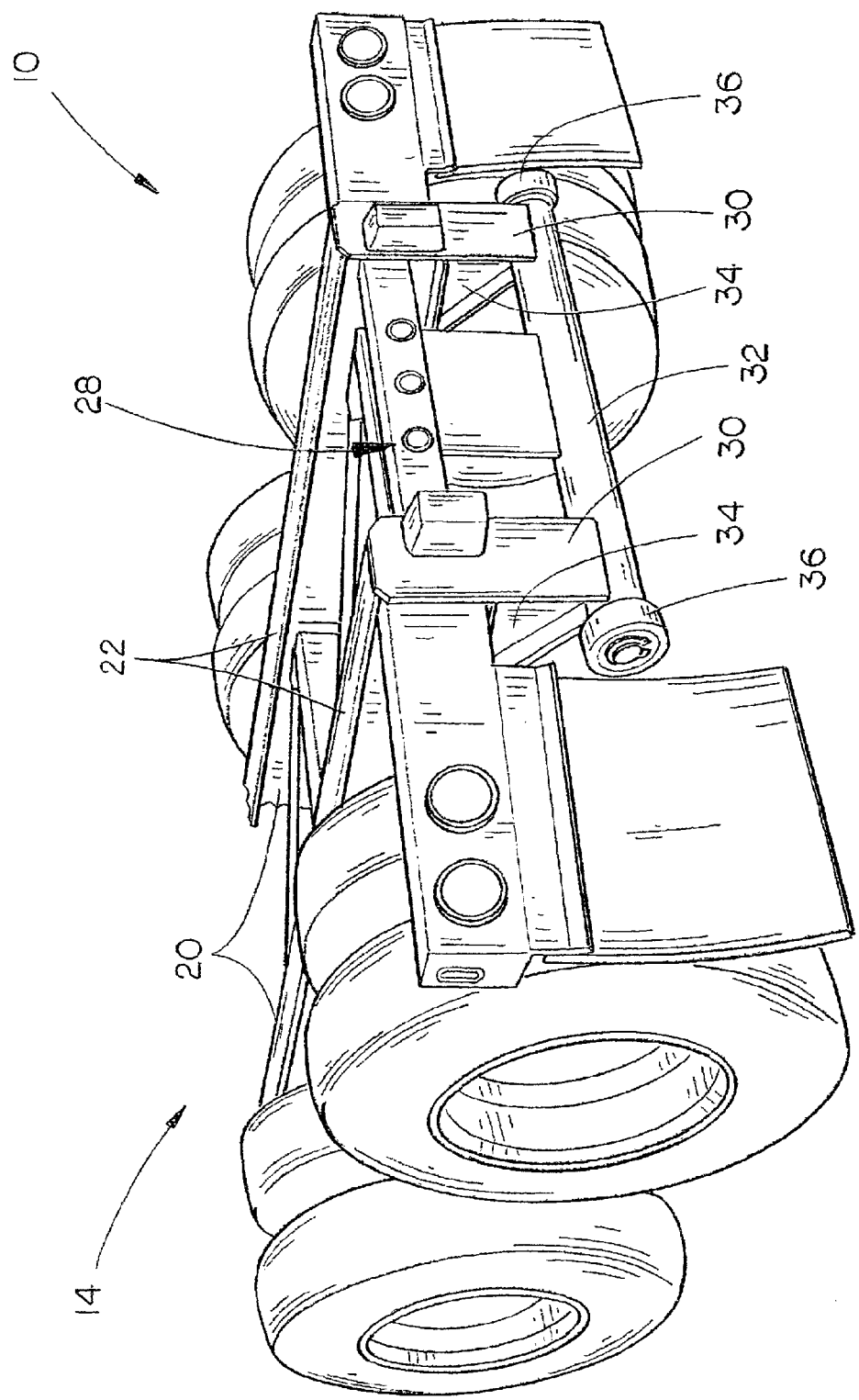
FIG. 2 is an enlarged perspective view of the rearward end of the trailer of the invention.
Figure 3:
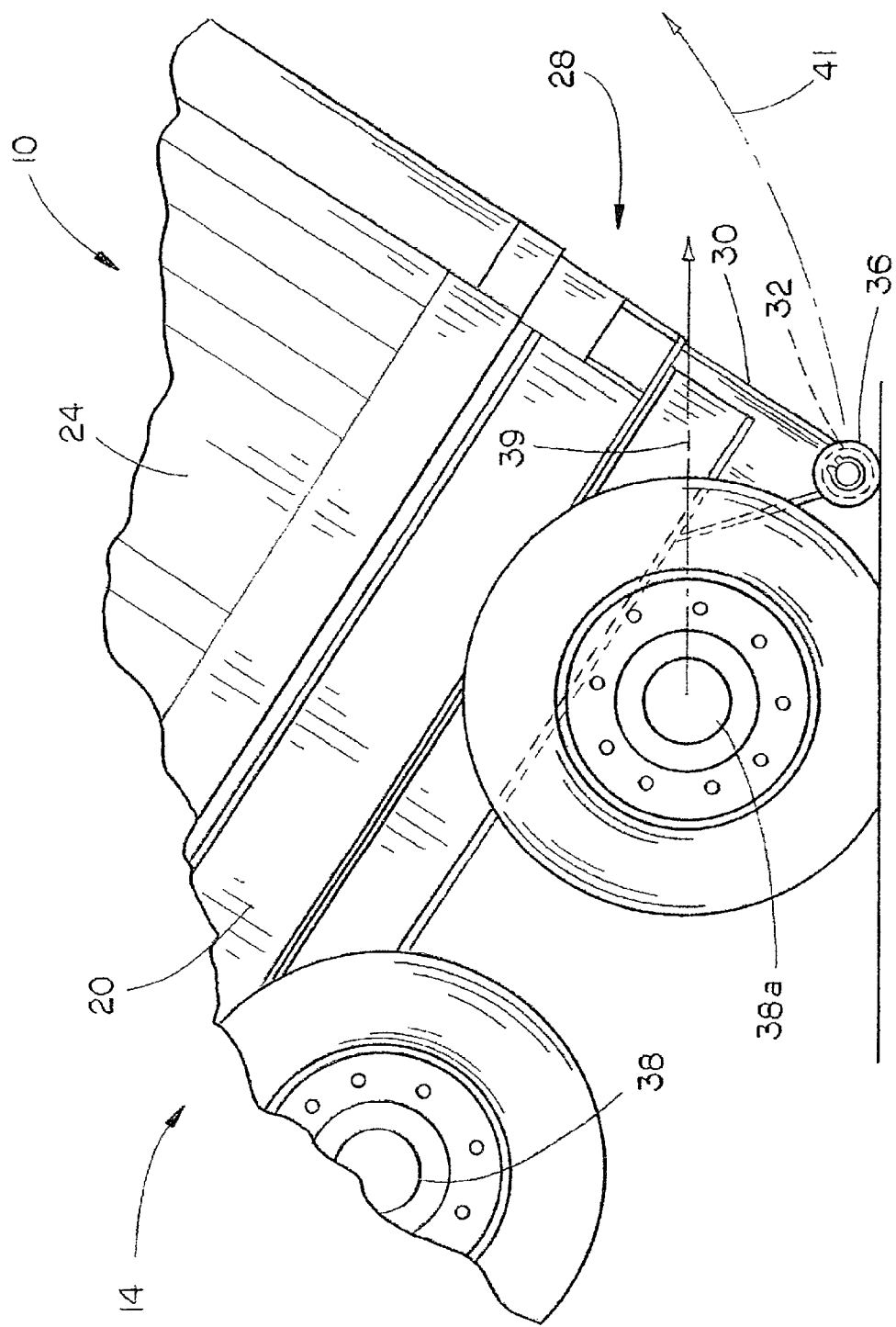
FIG. 3 is an enlarged elevational view of the rearward end of the trailer showing the trailer in the tipped-up position.

Referring now to FIGS. 2 and 3, frame 14 includes a pair of elongated, parallel beams 20 having an upper support surface 22, upon which a shipping container 24 is selectively, removably mounted. In the method of loading of the present invention, container 24 is mounted on trailer 10 with its operable doors 26 (shown in FIG. 4) positioned towards the forward end 14b of trailer frame 14. Doors 26 are typically positioned towards the rearward end of the trailer in conventional, prior art applications.

ICC bumper 28 is mounted to the rearward end of beams 20 and includes a pair of arms 30 which depend from the rearward ends of beams 20 and support a horizontal lower member 32. A gusset plate 34 is affixed between each arm 30 and the respective beam 20, to strengthen the lower member 32. Preferably, lower member 32 is a cylindrical shaft, but may be formed of other cross-sectional shapes. Because bumper 28 is required by federal regulations, its height above the ground is also predetermined. Lower member 32, gusset plates 34, and the other components of the bumper 28 are "beefed up" to strengthen the bumper for use in the method of the present invention.

At least one rotatable bearing 36 is operably mounted to the lower member 32, for rotation on an axis coaxial with the longitudinal axis of lower member 32. In the preferred embodiment of the invention, shown in the drawings, a bearing 36 is mounted to each end of lower member 32. As shown in FIGS. 2 and 3, each bearing 36 is preferably disk-shaped, and has a diameter that is greater than the diameter of lower member 32. If lower member 32 is formed of some other cross-sectional shape, then bearings 36 must have a diameter greater than the lowermost extent of lower member 32, such that the bearings 36 contact the ground upon tipping of the trailer 10, as shown in FIG. 3.

Wheelset 16 is typically of a type including a plurality of axles 38 (see FIGS. 1 and 3), each axle having at least one wheel on each end to support frame 14. The rearward-most axle 38a and the associated support frame are specially designed to support the great weight, which is applied to the axle 38a during the loading process of the method of this invention, described in more detail hereinbelow.

Figure 4:
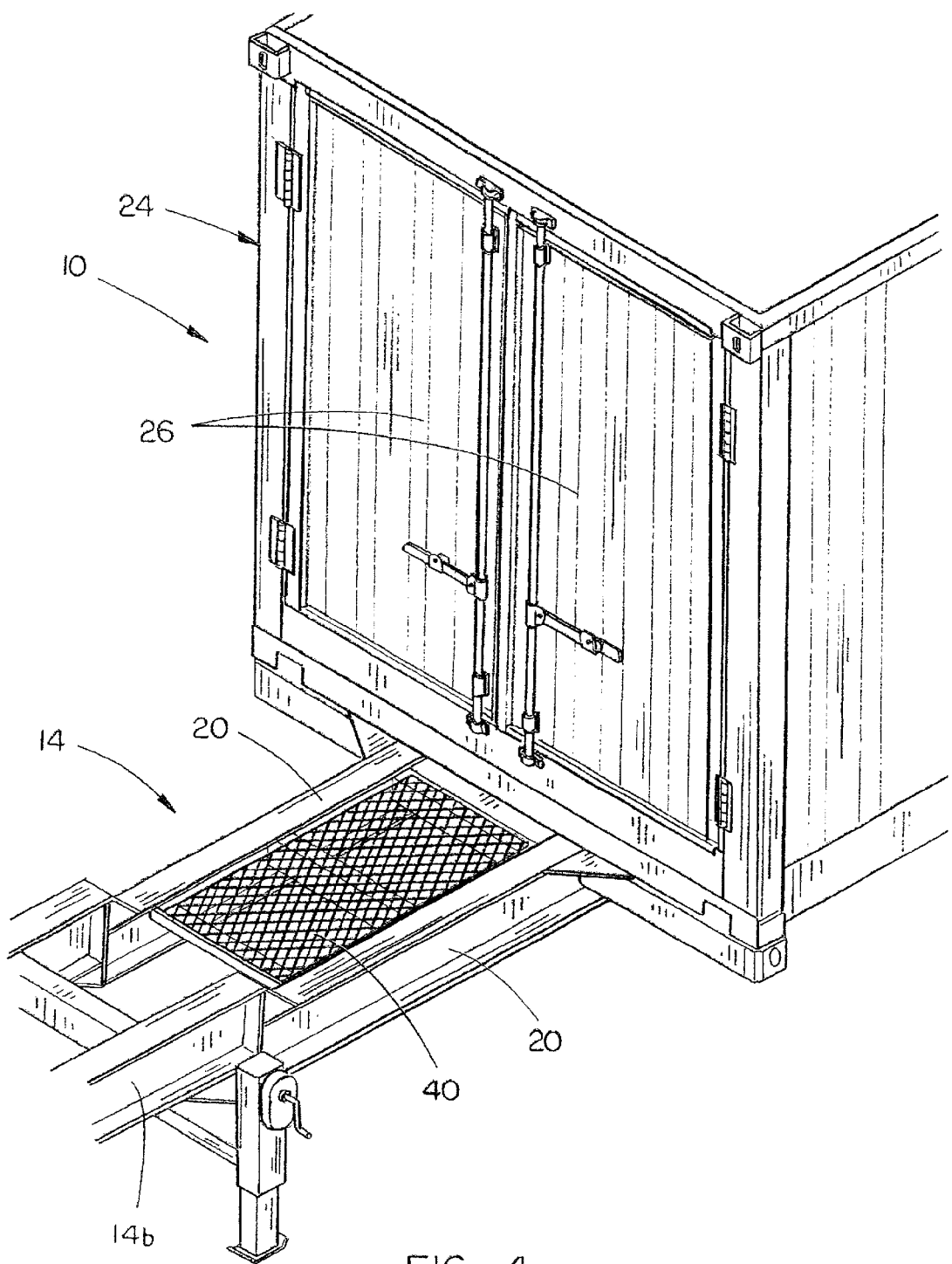
FIG. 4 is a perspective view of the forward end of the trailer and container thereon.

The method of the present invention begins with the step of providing the tip-up trailer 10, described in detail above, with a shipping container 24. The shipping container 24 is of the type having at least one operable door 26 in the end, as shown in FIGS. 1 and 4. FIG. 4 also shows the attachment of an expanded metal floor 40 between beams 20, to permit a person to stand on trailer frame 14 to operate the doors 26. Container 24 is secured to trailer 10 in a conventional fashion, but with the doors 26 oriented toward the forward end 14b of trailer frame 14.

The doors 26 are preferably opened prior to tipping the trailer 10, but the method of the invention does not require the doors be opened until the trailer is tipped up to the fully raised position shown in FIG. 1. A conventional jack 12 is connected to the kingpin 18 of the trailer 10, and the forward end of the trailer frame 14 is then raised and positioned beneath the spout of a grain elevator or other supply of bulk material to be loaded into the container 24. It can be seen that this loading method utilizes gravity to load the material into the container, eliminating any requirement for separate loading apparatus such as augers or conveyors. This fully raised position will cause the bearings 36 on the bumper lower member to come into contact with the ground, as shown in FIGS. 1 and 3. It can therefore be seen that the entire weight of the trailer 10, container 24, and the load within the container, are supported jointly between the bumper 28 and rearward-most axle 38.

Once the container has been loaded, the doors 26 are closed, and the trailer is slowly lowered by jack 12. It should be noted that the bearings 36 and the wheels on the rearward-most axle 38 will rotate as they roll along the ground during this step. As shown in FIG. 1, lowering the jack 12 will cause the trailer 10 to move rearwardly along the ground. This movement translates into rearward horizontal movement of axles 38, as shown by arrow 39 in FIG. 3. As axles 38 move rearwardly, bearings 36 will roll rearwardly along the ground for a distance, and then are lifted up off of the ground as the trailer forward is lowered, as shown by arrow 41. Without the installation of a bearing 36 on the lower member 32 of bumper 28, the bumper and frame would be severely damaged by such movement. It can also be seen that the additional structure and support for the bumper 28 and rearward-most axle 38a are needed to support the great weight of the entire load which is placed into container 24.

It should also be noted that prior art use of tip-up trailers for dumping or unloading bulk materials from a container did not require such structure. This is because the material is continuously removed from the trailer during the lifting process. By the time the trailer reaches the fully raised position, the entire load of material has been removed from the trailer.

Whereas the invention has been shown and described in connection with the preferred embodiment thereof, many modifications, substitutions and additions may be made which are within the intended broad scope of the appended claims.

I claim:

1. A tip-up trailer, comprising:

an elongated, generally horizontal frame with an upper support surface, and forward and rearward ends:

a wheelset connected to the frame proximal the rearward end, having at least one axle and a wheel on opposing ends of the axle:

a rigidly affixed ICC bumper mounted on the rearward end of the frame and depending in a rigid and fixed position from the frame, said bumper including a generally horizontal lower member; and a rotatable bearing operably mounted on the lower member for rotation on an axis coaxial with a longitudinal axis of the lower member, said bearing having a diameter sufficient to project beyond the lowest extent of the ICC bumper;

said wheelset including a plurality of axles, and wherein a rearward axle and the bumper are structurally designed to support the entire weight of the trailer and a loaded container supported on the trailer.

2. The trailer of claim 1, wherein said bearing includes a pair of bearings, one mounted at opposing ends of said lower member.

3. The trailer of claim 2, wherein said bearings are disk-shaped rollers.

4. The trailer of claim 1, wherein said trailer frame includes a pair of parallel, elongated beams extending longitudinally the length of the trailer and having forward and rearward ends, wherein said bumper includes a pair of rigidly affixed arms depending from rearward ends of the beams to support the lower member, and further comprising a gusset plate affixed between each beam and arm.

* * * * *